(12) United States Patent
Dawson et al.

(10) Patent No.: US 8,037,187 B2
(45) Date of Patent: Oct. 11, 2011

(54) RESOURCE EXCHANGE MANAGEMENT WITHIN A CLOUD COMPUTING ENVIRONMENT

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 12/636,664

(22) Filed: Dec. 11, 2009

(65) Prior Publication Data

US 2011/0145413 A1 Jun. 16, 2011

(51) Int. Cl.
*G06F 15/173* (2006.01)
(52) U.S. Cl. .......... 709/226; 370/468; 370/254; 705/38; 548/103
(58) Field of Classification Search .................... 705/38; 548/103; 370/468
See application file for complete search history.

(56) References Cited

U.S. PATENT DOCUMENTS

| | | | | |
|---|---|---|---|---|
| 6,888,002 B2 * | 5/2005 | Herrmann et al. | ............ | 548/103 |
| 7,281,043 B1 * | 10/2007 | Davie | ........................... | 709/226 |
| 7,509,285 B1 * | 3/2009 | Maniar et al. | .................... | 705/38 |

| | | | | |
|---|---|---|---|---|
| 2008/0080396 A1 * | 4/2008 | Meijer et al. | .................. | 370/254 |
| 2008/0080552 A1 * | 4/2008 | Gates et al. | .................... | 370/468 |
| 2008/0320140 A1 | 12/2008 | Simard et al. | | |

FOREIGN PATENT DOCUMENTS

EP PCT 2010065637 10/2010

OTHER PUBLICATIONS

Mell et al., "The NIST Definition of Cloud Computing", National Institute of Standards and Technology, Information Technology Laboratory, Version 15, Oct. 7, 2009, 2 pages.
Dubie, D., "Cloud-management wares multiply", IT World, May 19, 2009, 2 pages. http://www.itworld.com/print/68128.
Elmroth, E. et al., "Accounting and Billing for Federated Cloud Infrastructures", 2009 Eighth International Conference on Grid and Cooperative Computing, pp. 268-275.

(Continued)

*Primary Examiner* — Tammy T Nguyen
(74) *Attorney, Agent, or Firm* — William E. Scheisser; Ronald A. D'Alessandro; Keohane & D'Alessandro PLLC (57) ABSTRACT

The present invention provides a solution for resource sharing (e.g., inter-Cloud) within a Cloud-computing environment. One objective of the present invention is to better utilize idle public or private Cloud infrastructures and improve the availability of Cloud services by allowing different Cloud service providers to virtually combine their services and infrastructures. In the event that there is not enough capacity for a single Cloud service provider to manage its workload, the workload may be shifted to additional infrastructures within the Cloud. The result of the workload shift may reduce the unavailability of Cloud services to the Cloud end-user by allowing another Cloud service provider to temporarily handle the workload. Based on the resource sharing activities, compensation (e.g., credits/tokens) can be exchanged between the participating Cloud providers to reflect their participation in the resource exchange.

19 Claims, 6 Drawing Sheets

OTHER PUBLICATIONS

Rochwerger, B. et al., "The Reservoir model and architecture for open federated cloud computing", IBM Journal of Research and Development, Apr. 6, 2009, pp. 1-11.

Elmroth, E. et al., "Interfaces for Placement, Migration, and Monitoring of Virtual Machines in Federated Clouds", 2009 Eighth International Conference on Grid and Cooperative Computing, pp. 253-260.

Vaquero, L., "A Break in the Clouds: Towards a Cloud Definition", ACM SIGCOMM Computer Communication Review. vol. 39, No. 1, Jan. 2009, pp. 50-55.

Mell et al., "The NIST Definition of Cloud Computing", National Institute of Standards and Technology, Information Technology Laboratory, Version 15, Oct. 7, 2009, 2 pages.

Bernstein, D. et al., "Blueprint for the Intercloud—Protocols and Formats for Cloud Computing Interoperability", 2009 Fourth International Conference on Internet and Web Applications and Services, pp. 328-336.

Buyya, R. et al., "Cloudbus Toolkit for Market-Oriented Cloud Computing", CloudCom 2009, LNCS 5931, pp. 24-44.

* cited by examiner

RESOURCE EXCHANGE MANAGEMENT WITHIN A CLOUD COMPUTING ENVIRONMENT

CROSS-REFERENCE TO RELATED APPLICATION

This application is related in some aspects to pending application number 12/630,079, having the title "INTER-CLOUD RESOURCE SHARING WITHIN A CLOUD COMPUTING ENVIRONMENT", filed on Dec. 3, 2009, the entire contents of which are herein incorporated by reference.

FIELD OF THE INVENTION

The present invention generally relates to Cloud computing. Specifically, the present invention relates to credit management for resource sharing (e.g., inter-Cloud) within a Cloud computing environment.

BACKGROUND OF THE INVENTION

Cloud computing has become a popular way to offer various Information Technology (IT) concepts as services. In one implementation, a consumer or requestor can request a service they desire and transact with a Cloud provider for the needed service. A Cloud provider's business opportunity can be limited or constrained by the physical resources they have installed or by their capacity to procure additional resources in a timely and cost-efficient manner. In many cases, if the customer (service requester) has not allowed for ample lead time, then the request may not be fulfilled by the Cloud provider or may not be fulfilled in a timely manner.

SUMMARY OF THE INVENTION

The present invention provides a solution for resource sharing (e.g., inter-Cloud) within a Cloud-computing environment. One objective of the present invention is to better utilize idle public or private Cloud infrastructures and improve the availability of Cloud services by allowing different Cloud service providers to virtually combine their services and infrastructures. In the event that there is not enough capacity for a single Cloud service provider to manage its workload, the workload may be shifted to additional infrastructures within the Cloud. The result of the workload shift may reduce the unavailability of Cloud services to the Cloud end-user by allowing another Cloud service provider to temporarily handle the workload.

A first aspect of the present invention provides a method for providing credit management for resource sharing within a Cloud computing environment, comprising: assessing a resource requirement needed to fulfill a request received on a first Cloud provider; determining whether the first Cloud provider has resources available to meet the resource requirement; identifying a second Cloud provider capable of fulfilling any shortfall between the resources available for the first Cloud provider and the resource requirement; determining an availability of a set of resources of the second Cloud provider to fulfill the shortfall; and computing a credit-based cost for use of the set of resources of the second Cloud provider to fulfill the shortfall, the credit-based cost being based on the type of each of the set of resources and a duration during which each of the set of resources is utilized to fulfill the shortfall.

A second aspect of the present invention provides a system for providing credit management for resource sharing within a Cloud computing environment, comprising: a memory medium comprising instructions, a bus coupled to the memory medium; and a processor coupled to the bus that when executing the instructions causes the system to: assess a resource requirement needed to fulfill a request received on a first Cloud provider; determine whether the first Cloud provider has resources available to meet the resource requirement; identify a second Cloud provider capable of fulfilling any shortfall between the resources available for the first Cloud provider and the resource requirement; determine an availability of a set of resources of the second Cloud provider to fulfill the shortfall; and compute a credit-based cost for use of the set of resources of the second Cloud provider to fulfill the shortfall, the credit-based cost being based on the a type of each of the set of resources and a duration during which each of the set of resources is utilized to fulfill the shortfall.

A third aspect of the present invention provides a computer readable medium containing a program product for providing credit management for resource sharing within a Cloud computing environment, the computer readable medium comprising program code for causing a computer to: assess a resource requirement needed to fulfill a request received on a first Cloud provider; determine whether the first Cloud provider has resources available to meet the resource requirement; identify a second Cloud provider capable of fulfilling any shortfall between the resources available for the first Cloud provider and the resource requirement; determine an availability of a set of resources of the second Cloud provider to fulfill the shortfall; and compute a credit-based cost for use of the set of resources of the second Cloud provider to fulfill the shortfall, the credit-based cost being based on the a type of each of the set of resources and a duration during which each of the set of resources is utilized to fulfill the shortfall.

A fourth aspect of the present invention provides a method for deploying a system for providing credit management for resource sharing within a Cloud computing environment, comprising: providing a computer infrastructure being operable to: assess a resource requirement needed to fulfill a request received on a first Cloud provider; determine whether the first Cloud provider has resources available to meet the resource requirement; identify a second Cloud provider capable of fulfilling any shortfall between the resources available for the first Cloud provider and the resource requirement; determine an availability of a set of resources of the second Cloud provider to fulfill the shortfall; and compute a credit-based cost for use of the set of resources of the second Cloud provider to fulfill the shortfall, the credit-based cost being based on the type of each of the set of resources and a duration for which each of the set of resources is utilized to fulfill the shortfall.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. Cloud Computing Definitions
II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models (Also known as "Cloud implementations" or "Cloud types") are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Implementation of the Invention

The present invention provides a solution for managing credits for resource sharing (e.g., inter-Cloud) within a Cloud-computing environment. One goal of this invention is to better utilize idle public or private Cloud infrastructures and improve the availability of Cloud services by allowing different Cloud service providers to virtually combine their services and infrastructures. In the event that there is not enough capacity for a single Cloud service provider to manage its workload, the workload may be shifted to additional infrastructures within the Cloud. The result of the workload shift may reduce the unavailability of Cloud services to the Cloud end-user by allowing another Cloud service provider to temporarily handle the workload.

The inter-Cloud resource sharing may be based on a credit system. For each successful inter-Cloud resource sharing instance, a Cloud provider could receive a credit for its services. In one embodiment, this can based on the inter-Cloud resource sharing and how to account for the different types of resource sharing. The inter-Cloud resource sharing may be based on a monetary credit system that is used to transpose the use of "credits" that one Cloud provider may utilize from another. These credits are the results of the following examples for inter-Cloud resource sharing. These examples may include, but are not limited to, service level agreements for performance or availability, Cloud service functionality, access to different Cloud resources, time sensitivity of Cloud resources, duration of inter-Cloud access and the number of times within a given time period inter-Cloud resources needed to be shared.

Figure 1:
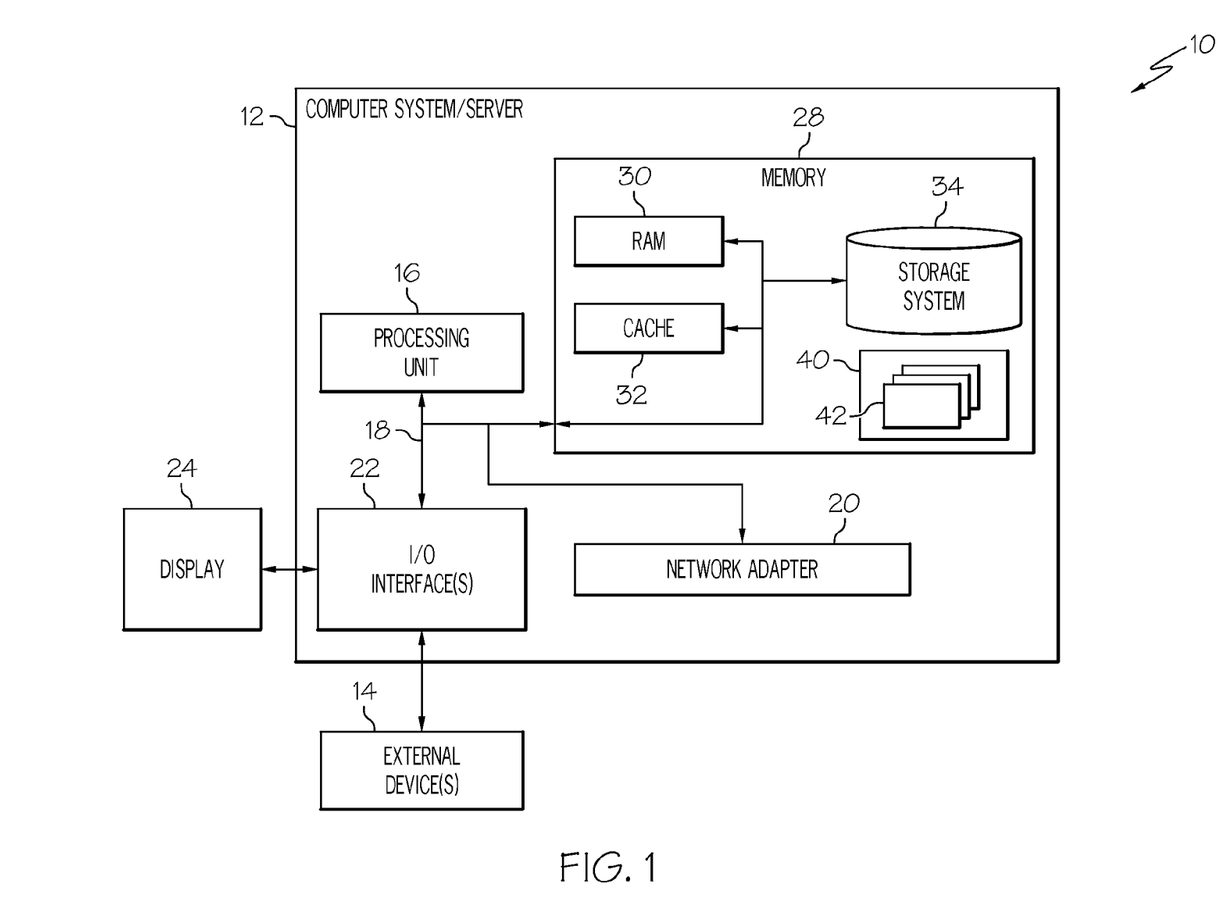
FIG. 1 shows a Cloud system node according to the present invention.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
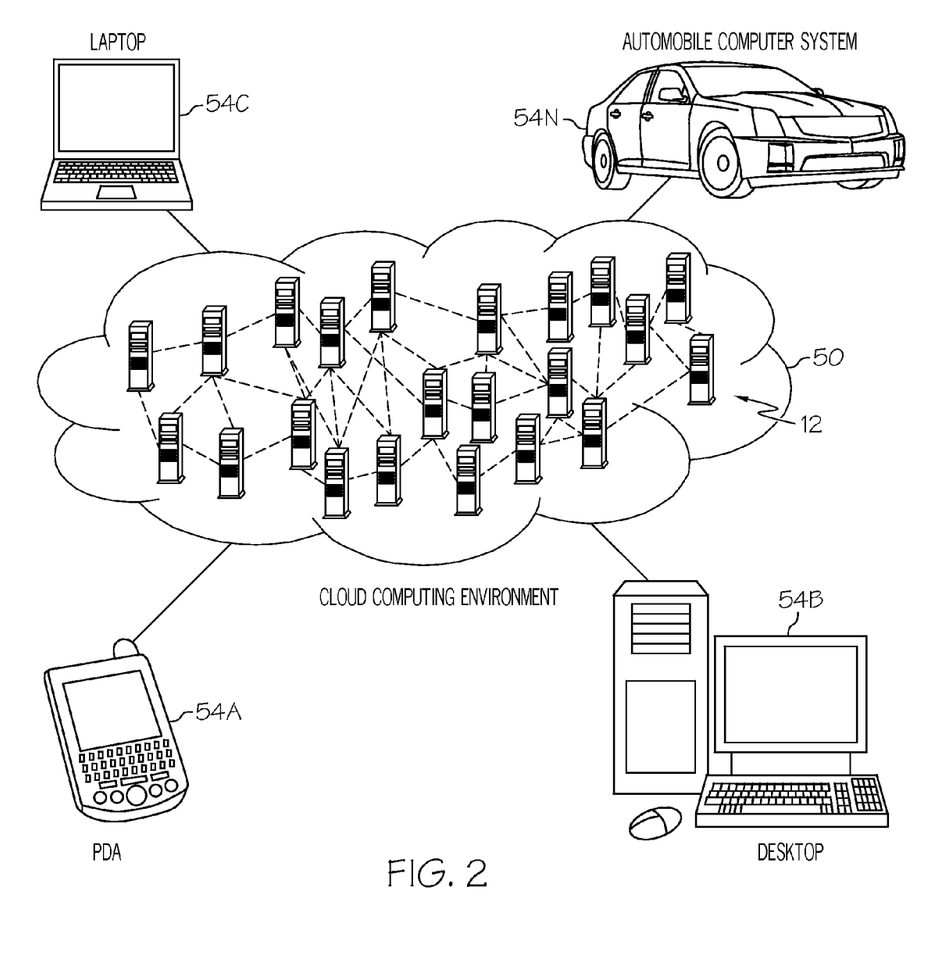
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
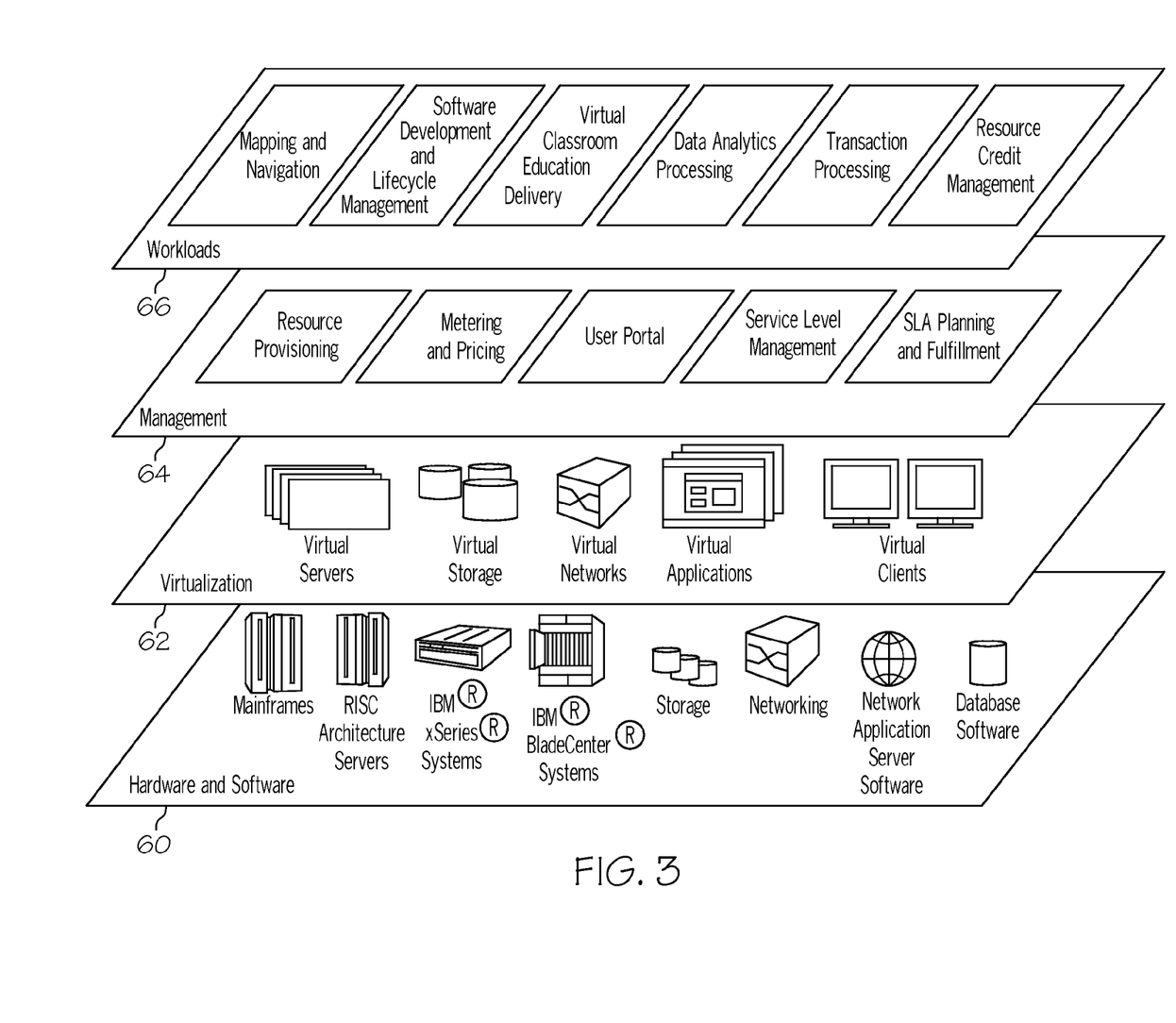
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and Pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and resource credit management. As mentioned above, all of the foregoing examples described with respect to FIG. 3 are illustrative only, and the invention is not limited to these examples.

Resource credit management functionality generally implements the teachings of the present invention. To this extent, resource credit management functionality can be implemented as hardware, software (e.g., program modules 42 of utility/program 40), or a combination thereof. Regardless, the resource credit management functions of the present invention will be further described in conjunction with FIGS. 4-6, as well as the illustrative examples set forth below.

As mentioned above, the present invention provides a solution to allow for Cloud service providers to partner together for inter-Cloud resource sharing. The inter-Cloud resources that are shared between Cloud service providers are managed by using a fair-share algorithm that accounts for the different Cloud resources that are "borrowed" or shared. Compensation in the form of credits or tokens are utilized to track the resource usage (CPU, memory, storage, bandwidth) between the Cloud service providers as well as the use of credits being removed for errors and failure to provide services in the event of a need for inter-Cloud resource sharing. The fair-share algorithm will be used to provide the tracking mechanism and will feed a standard accounting system that the Cloud service providers may use. The present invention may allow for Cloud providers that are partnered together, based on their similar Cloud services and applications, to utilize the credit system for inter-Cloud resource sharing. The need for inter-Cloud resource sharing may be necessary in the event that a single Cloud service provider did not have enough capacity to provide access to services.

As mentioned, the inter-Cloud resource sharing of the present invention would utilize a "fair-share" algorithm. This "fair-share" algorithm may allow workload to be shared and tracked among Cloud providers and based on the results of the resource sharing. For example, if a large publishing establishment was using a Cloud service for the rendering of large color documents, and its Cloud service provider did not have enough capacity to meet service level agreement to complete the rendering job, the additional workload could be transferred to idle resources hosted by another Cloud service provider. This Cloud service provider would track the performance, time, and access to its Cloud resources and generate credits that may be used for access to another Cloud service provider or the credits could be turned in for currency.

The potential for inter-Cloud resource sharing is based on common technology infrastructures/applications, geography, vendor alignment and capacity, as well as the Cloud service provider's willingness to partner and prearranged contracts with one another. This consortium of Cloud service providers may act as a single entity and utilize the fair-share algorithm among them.

This "fair-share" algorithm would be used to track the workload that is routed between the Cloud service providers. The fair-share algorithm would be responsible for tracking the inter-Cloud resources and determine how to account for the different types of resource sharing. The algorithm would use a monetary credit system to track the sharing of resources between the Cloud providers in the consortium. Access to individual Cloud services would equate to different prices based on the time, duration, service level agreements for performance or availability, Cloud service functionality, or the complexity of the Cloud services that are provided. In the event that the Cloud service provider that provided access to its available resources led to errors or problems within the Cloud service, credits maybe be discounted, removed, or negated. Individual agreements may be based on the contracts between the different Cloud service providers.

Illustrative Example

Figure 4:
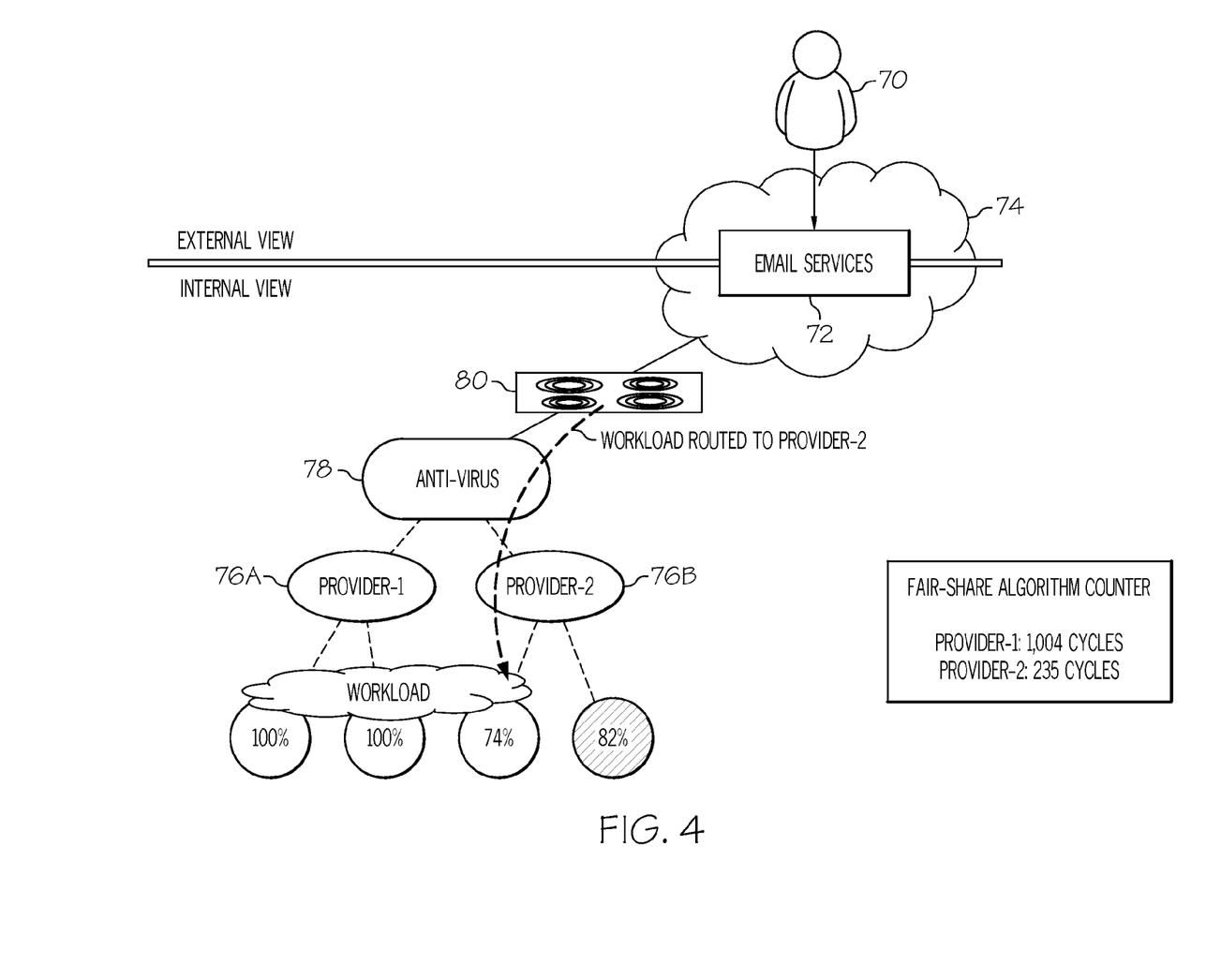
FIG. 4 shows an illustrative example of inter-Cloud resource sharing according to the present invention.

Referring now to FIG. 4, consider the example set forth below of a Cloud client 70 accessing Email 72 services from a Cloud infrastructure 74 (which can be Cloud environment 12 of FIG. 1). Assume that Provider-1 76A and Provider-2 76B have signed an agreement to share their Cloud resources in the event that one Cloud provider cannot handle the workload within its own infrastructure. The Cloud client 70 has procured Anti-Virus services 78 from Provider-1 76A. Further assume that after a new virus has been released, the workload to handle all of the anti-virus services is overwhelming Provider-1 76A. A routing tool 80 that services between both Cloud infrastructures is alerted that Provider-1 76A is out of capacity for Anti-Virus services 78 and Provider-2 76B has additional capacity. The routing tool 80 then routes the workload to Provider-2 76B for failover, and Cloud client 70's workload is continued without Cloud client 70 noticing where Anti-Virus services 78 are located.

The fair-share algorithm now accounts for tracking the resources, time, duration, and services that Provider-1 76A is now using as part of Provider-2 76B's Cloud infrastructure. The duration, errors, resources (CPU, memory, bandwidth, and storage), time, and price system have all been agreed upon between Provider-1 76A and Provider-2 76B. The fair-share algorithm calculates the number of cycles that Provider-2 76B has used for the inter-Cloud resource sharing and adds these credits to an accounting system to track the ebb and flow between resource pool sharing.

Figure 5:
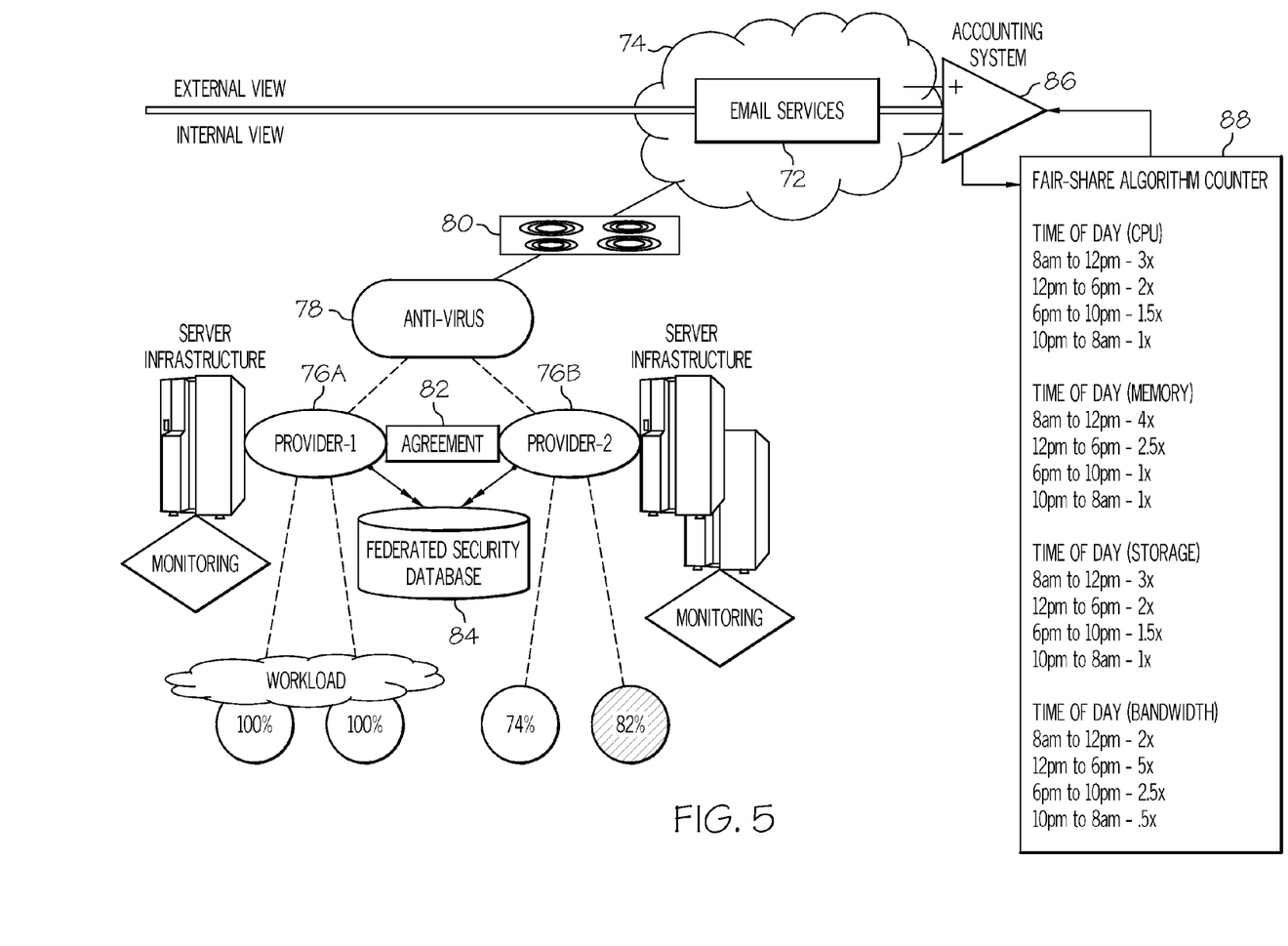
FIG. 5 shows an illustrative example of using a fair-share algorithm counter to manage credits for inter-Cloud resource sharing according to the present invention.

Referring to FIG. 5, these concepts will be explained in greater detail. As depicted, one or more of the following components can be utilized in this illustrative example: (1) a fair-share algorithm to track the usage of resources between Cloud systems; (2) a standard accounting system to track the credits/debits for Cloud resources; (3) a routing tool to shift workload between different Cloud service providers; (4) a contract agreement between Cloud service providers; (5) a common infrastructure and applications to support identical Cloud services; (6) a federated security directory/database 82 for access to Cloud systems and identity management/tracking; and (7) a common monitoring and management framework between the Cloud service providers.

For the purposes of the illustrative example of FIG. 5, assume that the following are providers, components, and functions provided for this embodiment:

Provider-1 76A: Provides Anti-Virus Cloud services.

Provider-2 76B: Provides Anti-Virus Cloud services.

Logical group (Anti-Virus) 78: Provider-1 76A and Provider-2 76B have an agreement 82 to share workload. Workload will be tallied on a weekly basis, and each Cloud service provider 76A-B will be compensated according to an agreed-upon credit/debit schedule.

Routing tool 80: Provides routing of Cloud services based on availability of Cloud service services.

Fair-Share algorithm 86: Provides a basic accounting system on an hourly/daily/weekly/monthly system to track application workload that is shared and routed to a secondary provider.

For the purposes of this example, assume the following illustrative steps:

(1) A client is accessing the anti-virus Cloud service (Provider-1 76A). Provider-1 76A provides Anti-Virus services 78 for all Internet gateway enterprise email 72.

(2) A virus is released in Location X and the release of this virus floods Provider-1 76A. Provider-1 76A is now at maximum capacity for providing anti-virus service to its client. Due to Provider-1 76A utilizing it, capacity, the flow of email messages begins to slow and latency is potentially compromising the SLA target for Provider-1 76A.

(3) A routing tool 80 determines that Provider-1 76A is at maximum capacity. The routing tool 80 routes workload to Provider-2 76B at 5 p.m.

(4) Accounting system 86 is activated on Provider-2 76B to capture the workload that it is performing on the behalf of Provider-1 76A. Using the common security framework and shared infrastructure, the workload and data is logged both internally and to a central "system log" server. The Fair-Share Algorithm Counter 88 is then activated based on the type of resource needed, as well as the timing and duration of the inter-Cloud resource sharing. As can be seen, Fair-Share Algorithm Counter 88 outlines the different weights that the resources Cloud have during the time period of use within the Cloud.

(5) Since workload was sent over from Provider-1 76A, Provider-2 76B now begins processing Provider-1 76A workload for a period of 1.5 hours at an average capacity of 78% for CPM, Memory, Storage and Bandwidth. Since the timing was at 5 PM, the following illustrative weights were calculated:

5 PM:
  CPU: 2x
  Memory: 2.5x
  Storage: 2x
  Bandwidth: 5x (6) The workload on Provider-2 76B is completed (7) The fair-sharing algorithm counter 88 captures the local log and centralized system log data to verify accuracy. Based on the timing and calculations above, for each minute of use and the 90 minute usage, the following credits were attributed to Provider-2 76B:

CPU: 2x*90=180 credits
Memory: 2.5x*90=225 credits
Storage: 2x*90=180 credits
Bandwidth: 5x*90=450 credits
Total: 1035 credits for Provider-2 76B (8) Based on a predefined partnership agreement between Provider-1 76A and Provider-2 76B, the system credits are transferred to Provider-2 76B.

(9) An email is automatically generated by the fair-sharing algorithm counter 88 to send to Provider-1 76A and Provider-2 76B that outlines in detail the workload that Provider-2 76B was responsible for.

(10) At the end of the certain period of time (e.g., weekly, monthly, etc.), the workloads are calculated and a purchase order is generated by either Provider-1 76A or Provider-2 76B to compensate its Cloud service peer for services provided.

Figure 6:
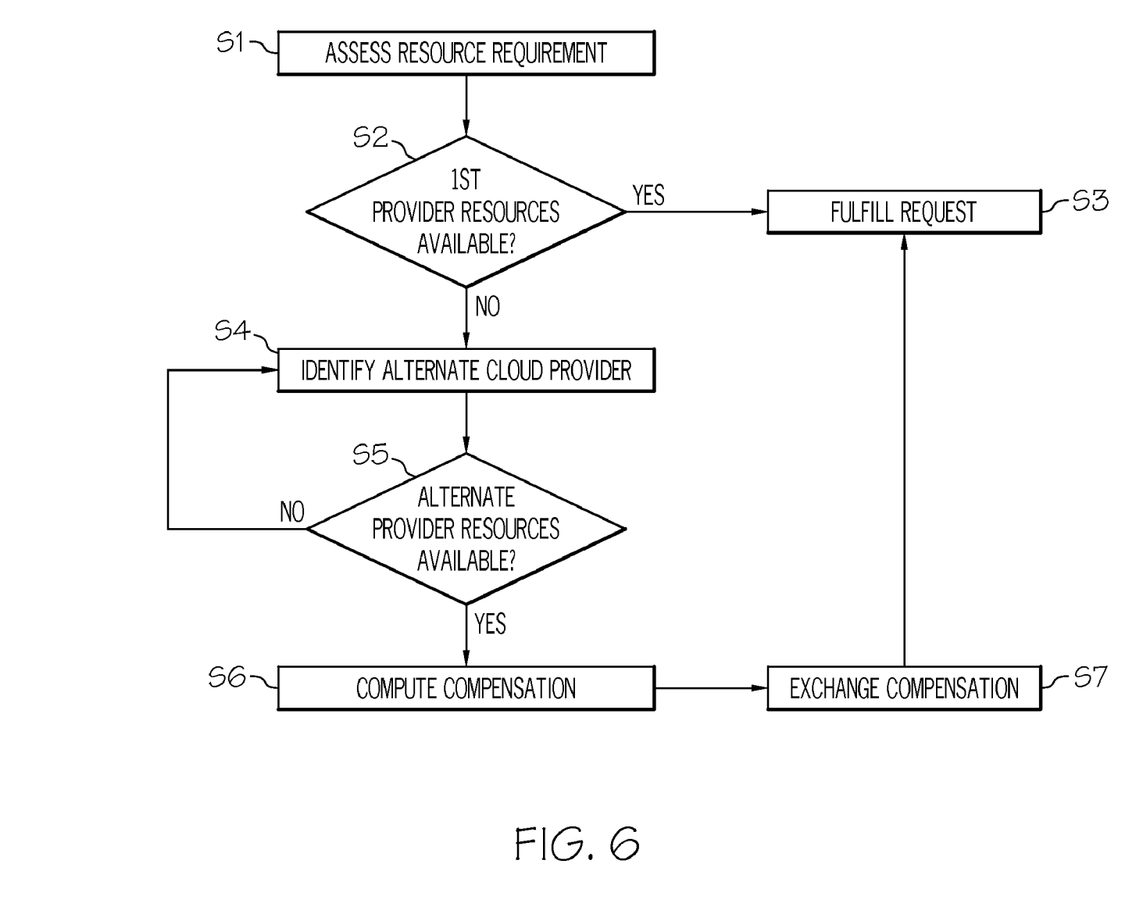
FIG. 6 shows a flow diagram of a method according the present invention.

Referring now to FIG. 6, a method flow diagram according to the present invention is shown. As depicted in step S1, a resource requirement needed to fulfill a request received on a first Cloud provider is assessed. In step S2, it is determined whether the first Cloud provider has resources available to meet the resource requirement. If so, the request is fulfilled in step S3. If not, an alternate (e.g., second) Cloud provider capable of fulfilling any shortfall between the resources available for the first Cloud provider and the resource requirement is identified in step S4 (e.g., by accessing a directory that associates Cloud providers with their resources). In step S5, it is determined whether the alternative Cloud provider has a set of resources available to fulfill the shortfall. If not, the process is returned to step S4. If so, a credit-based cost is computed for use of the set of resources of the alternate Cloud provider to fulfill the shortfall in step S6. The credit-based cost can be based on the type of resource being used, a duration for which each are utilized, and/or a time of day in which they are used (e.g., for peak time vs. off-peak time purposes). In step S7, the compensation is exchanged between the first Cloud provider and the alternate Cloud provider (e.g., credit counts can be toggled) to address the credit-based cost. This can occur before, during, or after, the fulfillment of the request in step S4.

While shown and described herein as a resource credit management solution for resource sharing in a Cloud computing environment, it is understood that the invention further provides various alternative embodiments. For example, in one embodiment, the invention provides a computer-readable/useable medium that includes computer program code to enable a computer infrastructure to provide resource credit management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide resource credit management for inter-Cloud resource sharing. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement, and/or the service provider can receive payment from the sale of advertising content to one or more third parties.

In still another embodiment, the invention provides a computer-implemented method for providing resource credit management functionality. In this case, a computer infrastructure, such as computer system 12 (FIG. 1), can be provided, and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly, or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing credit management for resource sharing within a Cloud computing environment, comprising: assessing a resource requirement needed to fulfill a request received on a first Cloud provider; determining whether the first Cloud provider has resources available to meet the resource requirement; identifying a second Cloud provider capable of fulfilling any shortfall between the resources available for the first Cloud provider and the resource requirement; determining an availability of a set of resources of the second Cloud provider to fulfill the shortfall; and computing a credit-based cost for use of the set of resources of the second Cloud provider to fulfill the shortfall, the credit-based cost being based on a type of each of the set of resources and a duration during which each of the set of resources is utilized to fulfill the shortfall, the credit-based cost being further based on a weighting factor, the weighting factor being based on a time of day at which each of the set of resources is utilized.

2. The method of claim 1, further comprising exchanging compensation between the first Cloud provider and the second Cloud provider to address the credit-based cost.

3. The method of claim 2, further comprising the exchanging comprising toggling credit counts of the first Cloud provider and the second Cloud provider to reflect allocation of the resources of the second Cloud provider by the first Cloud provider.

4. The method of claim 1, the resource requirement comprising at least one of the following: storage space, memory, bandwidth, or processor availability.

5. The method of claim 1, the identifying comprising accessing a directory of Cloud providers, the directory associating Cloud providers with their available resources.

6. The method of claim 1, the request being for at least one Cloud service.

7. A system for providing credit management for resource sharing within a Cloud computing environment, comprising: a memory device having instructions: a bus coupled to the memory medium; and a processor coupled to the bus that when executing the instructions causes the system to: assess a resource requirement needed to fulfill a request received on a first Cloud provider; determine whether the first Cloud provider has resources available to meet the resource requirement; identify a second Cloud provider capable of fulfilling any shortfall between the resources available for the first Cloud provider and the resource requirement; determine an availability of a set of resources of the second Cloud provider to fulfill the shortfall; and compute a credit-based cost for use of the set of resources of the second Cloud provider to fulfill the shortfall, the credit-based cost being based on the type of each of the set of resources and a duration during which each of the set of resources is utilized to fulfill the shortfall, the credit-based cost being further based on a weighting factor, the weighting factor being based on a time of day at which each of the set of resources is utilized.

8. The system of claim 7, the system being further caused to exchange compensation between the first Cloud provider and the second Cloud provider to address the credit-based cost.

9. The system of claim 8, the system being further caused to toggle credit counts of the first Cloud provider and the second Cloud provider to reflect allocation of the resources of the second Cloud provider by the first Cloud provider.

10. The system of claim 7, the resource requirement comprising at least one of the following: storage space, memory, bandwidth, or processor availability.

11. The system of claim 7, the system being further caused to access a directory of Cloud providers, the directory associating Cloud providers with their available resources.

12. The system of claim 7, the request being for at least one Cloud service.

13. A computer readable storage device containing a program product for providing credit management for resource sharing within a Cloud computing environment, the computer readable medium comprising program code for causing a computer to: assess a resource requirement needed to fulfill a request received on a first Cloud provider; determine whether the first Cloud provider has resources available to meet the resource requirement; identify a second Cloud provider capable of fulfilling any shortfall between the resources available for the first Cloud provider and the resource requirement; determine an availability of a set of resources of the second Cloud provider to fulfill the shortfall; and compute a credit-based cost for use of the set of resources of the second Cloud provider to fulfill the shortfall, the credit-based cost being based on the type of each of the set of resources and a duration during which each of the set of resources is utilized to fulfill the shortfall, the credit-based cost being further based on a weighting factor, the weighting factor being based on a time of day at which each of the set of resources is utilized.

14. The computer readable storage device containing the program product of claim 13, the computer readable medium further comprising program code for causing the computer to exchange compensation between the first Cloud provider and the second Cloud provider to address the credit-based cost.

15. The computer readable storage device containing the program product of claim 14, the computer readable medium further comprising program code for causing the computer to toggle credit counts of the first Cloud provider and the second Cloud provider to reflect allocation of the resources of the second Cloud provider by the first Cloud provider.

16. The computer readable storage device containing the program product of claim 13, the resource requirement comprising at least one of the following: storage space, memory, bandwidth, or processor availability.

17. The computer readable storage device containing the program product of claim 13, the computer readable medium further comprising program code for causing the computer to access a directory of Cloud providers, the directory associating Cloud providers with their available resources.

18. The computer readable storage device containing the program product of claim 13, the request being for at least one Cloud service.

19. A method for deploying a system for providing credit management for resource sharing within a Cloud computing environment, comprising: providing a computer infrastructure being operable to: assess a resource requirement needed to fulfill a request received on a first Cloud provider; determine whether the first Cloud provider has resources available to meet the resource requirement; identify a second Cloud provider capable of fulfilling any shortfall between the resources available for the first Cloud provider and the resource requirement; determine an availability of a set of resources of the second Cloud provider to fulfill the shortfall; and compute a credit-based cost for use of the set of resources of the second Cloud provider to fulfill the shortfall, the credit-based cost being based on the type of each of the set of resources and a duration during which each of the set of resources is utilized to fulfill the shortfall, the credit-based cost being further based on a weighting factor, the weighting factor being based on a time of day at which each of the set of resources is utilized.

* * * * *